(12) United States Patent
Nishimura

(10) Patent No.: US 8,081,094 B2
(45) Date of Patent: Dec. 20, 2011

(54) SIGNAL TRANSMISSION SYSTEM AND SIGNAL CONVERSION CIRCUIT

(75) Inventor: Shinichi Nishimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/680,737

(22) PCT Filed: Dec. 9, 2008

(86) PCT No.: PCT/JP2008/072729
§ 371 (c)(1),
(2), (4) Date: Mar. 29, 2010

(87) PCT Pub. No.: WO2009/075372
PCT Pub. Date: Jun. 18, 2009

(65) Prior Publication Data
US 2010/0238055 A1    Sep. 23, 2010

(30) Foreign Application Priority Data

Dec. 10, 2007  (JP) .................................. 2007-317929
Oct. 24, 2008  (JP) .................................. 2008-274350

(51) Int. Cl.
*H03M 9/00* (2006.01)
(52) U.S. Cl. ........................................ 341/100; 341/101
(58) Field of Classification Search .................. 341/100, 341/101
See application file for complete search history.

(56) References Cited

U.S. PATENT DOCUMENTS

| 5,808,490 | A | 9/1998 | Watanabe | 327/94 |
| 6,496,540 | B1 * | 12/2002 | Widmer | 375/242 |
| 7,587,537 | B1 * | 9/2009 | Burney | 710/71 |
| 7,656,325 | B1 * | 2/2010 | Andreev | 341/100 |
| 7,666,001 | B2 | 2/2010 | Nishimura | 439/67 |
| 2002/0005863 | A1 | 1/2002 | Nagai et al. | 345/698 |

FOREIGN PATENT DOCUMENTS

| EP | 982665 | 3/2000 |
| EP | 1705577 | 9/2006 |
| JP | 2001-036590 | 2/2001 |

OTHER PUBLICATIONS

National Semiconductor, Interface Signal Management Group, "LVDS Owner's Manual", Apr. 25, 1998, XP002178940.

* cited by examiner

*Primary Examiner* — Brian Young
(74) *Attorney, Agent, or Firm* — Fitzpatrick, Cella, Harper & Scinto

(57) ABSTRACT

A signal transmission system in which a serializer IC connected to first parallel signal wirings and a deserializer IC connected to second parallel signal wirings are connected by a transmission line. Among input terminals of the serializer IC, redundant input terminals which are not connected to the first parallel signal wirings are connected to one wiring obtained by branching off the first parallel signal wirings. When parallel signals are converted into a serial signal, their bit data is arranged into the serial signal which is temporally continuous. Thus, the number of transition times of the serial signal is reduced and radiation noises can be suppressed.

10 Claims, 9 Drawing Sheets

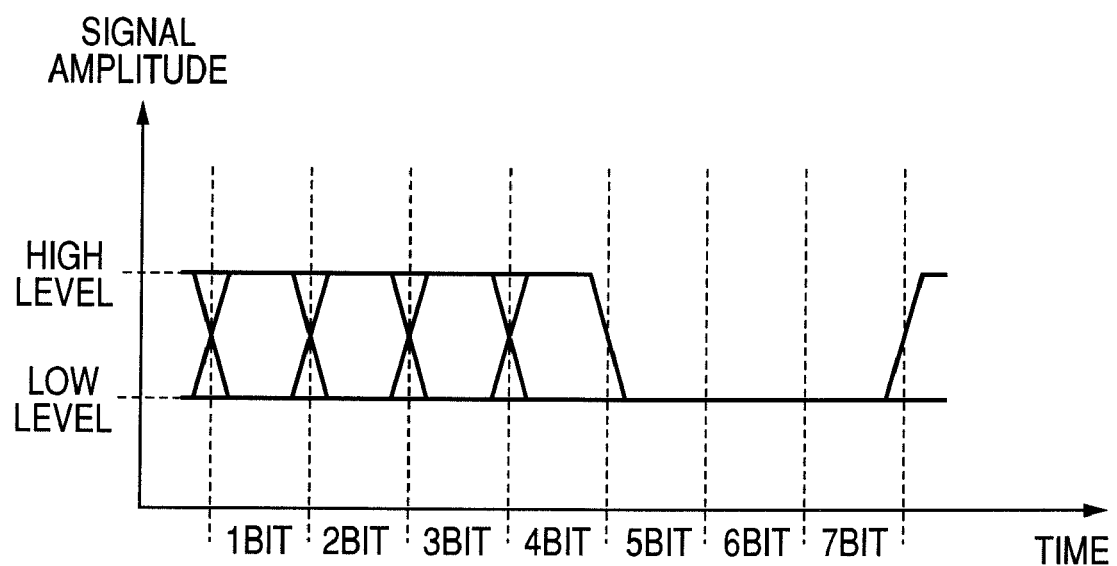

US 8,081,094 B2

SIGNAL TRANSMISSION SYSTEM AND SIGNAL CONVERSION CIRCUIT

This application claims the benefit of Japanese Patent Applications No. 2007-317929 filed on Dec. 10, 2007, and No. 2008-274350 filed on Oct. 24, 2008, which are hereby incorporated by reference herein in their entirety.

TECHNICAL FIELD

The invention relates to a transmission system for transmitting a data signal and to a transmission system for converting parallel signals into a serial signal and transmitting.

BACKGROUND ART

In a recent system for transmitting a data signal at a high speed, a serial signal transmission system such as IEEE1394, Universal Serial Bus, Ethernet (registered trademark), or the like is often used. Each of those transmission systems includes: a serializer IC for converting parallel signals into a serial signal; a transmission line for transmitting the serial signal which is converted by the serializer IC to a deserializer IC; and the deserializer IC for receiving the serial signal transmitted from the transmission line and converting it into the parallel signals again.

In those serial signal transmission systems, in the case of using the serializer IC having input terminals of n bits, the parallel signals which are input to the serializer IC are not always limited to a parallel signal of n bits. In the case where the input signals are parallel signals of m bits (m is an integer smaller than n), the input terminals corresponding to (n−m) bits are unused redundant input terminals. Such redundant input terminals are liable to be influenced by noises because they are in a floating state and this results in an erroneous operation in the serializer IC.

Therefore, wirings or a pattern of a stable voltage level such as power source or ground is connected to the redundant input terminals through resistors of a low or high resistance. By such a construction, it is prevented that the redundant input terminals enter the floating state, thereby suppressing exogenous noises.

However, in the case of such a serial signal transmission system, although the exogenous noises can be suppressed, radiation noises which are caused by the transmission of a high-speed digital signal cannot be suppressed. That is, the more the number of times of signal transition per unit time of the digital signal which is transmitted increases, a harmonic component of the serial signal increases and radiation noises are generated.

In the serial signal transmission system according to IEEE1394, a technique for encoding the serial signal as a preprocessing of the serial signal which is transmitted has been proposed in Japanese Patent Application Laid-Open No. 2001-036590 (Patent Document 1). That is, such a technique that when the input parallel signals are converted into a serial signal, the parallel signals are rearranged according to a predetermined rule by using a logic circuit and encoded, thereby suppressing the number of times of transition of the signals has been disclosed.

However, in the serial signal transmission system disclosed in Patent Document 1, it is necessary to execute the encoding process by a logic circuit on the parallel signals before they are input to the serializer IC. Therefore, it is necessary to add a special circuit other than the serializer IC to the encoding process, its costs are very high, and such a construction cannot be simply applied to the general all-purpose serializer IC.

In the case of the foregoing serial signal transmission system in which the wirings or pattern of the stable voltage level is connected to the redundant input terminals, the serializer IC rearranges the input parallel signals of n bits in predetermined order and transmits them as a serial signal of a bit pattern which are temporally continuous. Therefore, the bit signals from the redundant input terminals are also converted into a serial signal. That is, a signal which is always fixed to "1" if the redundant input terminals are connected to the power source and is always fixed to "0" if the redundant input terminals are connected to the ground is transmitted.

Therefore, since the bit signals from the redundant input terminals mentioned above are constant, a transition of the signal occurs between the constant signal and each of the bit signals before and after this signal at a probability of ½. Such a signal transition is fundamentally unnecessary in the serial signal transmission. If the signal transition is eliminated, the generated radiation noises can be suppressed without exerting an influence on the serial signal transmission.

DISCLOSURE OF THE INVENTION

It is an aspect of the present invention to provide a serial signal transmission system in which a signal transition which can occur in a serial signal which is converted by a serializer unit can be suppressed by an effective and simple construction.

According to an aspect of the present invention, a signal transmission system comprises: first parallel signal wirings; second parallel signal wirings; a serializer unit including a plurality of parallel signal input terminals connected to the first parallel signal wirings, a serial conversion unit for converting parallel signals input from the plurality of parallel signal input terminals into a serial signal, and a serial signal output unit for outputting the converted serial signal; a deserializer unit including a serial signal input unit for inputting the serial signal from the serializer unit, a parallel conversion unit for converting again the serial signal input from the serial signal input unit into the parallel signals, and a plurality of parallel signal output terminals for outputting the converted parallel signals to the second parallel signal wirings; and a transmission line for connecting the serializer unit and the deserializer unit, wherein one of the first parallel signal wirings connected to the parallel signal input terminals is branched off into a plurality of wirings, thereby forming branch wirings, the branch wirings are connected to the parallel signal input terminals, and when each of the signals input from the branch wirings is converted by the serial conversion unit, the signal is converted into the serial signal so as to be temporally continuous with the signal input from the one wiring.

According to another aspect of the present invention, a signal transmission system comprises a serializer unit input first parallel signals from first parallel signal wirings, a deserializer unit output second parallel signals to second parallel signal wirings, a transmission line for transmitting a serial signals from the serializer unit to the deserializer unit, wherein the serializer unit converting the first parallel signals into the serial signal and outputting the serial signal to the transmission line, and the deserializer unit converting the serial signal from the transmission line into the second parallel signals, and wherein one of the first parallel signal wirings is branched off into a plurality of wirings, thereby forming branch wirings, the branch wirings are connected to the serializer unit, and the serializer unit convert the signals from branch wirings into a part of the serial signal so as to be temporally continuous with the signal input from the one wiring.

The above and other objects of the invention will become more apparent from the following drawings taken in conjunction with the accompanying drawings.

BRIEF DESCRIPTION OF DRAWINGS

FIG. 9 is a schematic diagram illustrating a serial signal waveform which is transmitted in the second embodiment.

BEST MODE FOR CARRYING OUT THE INVENTION

Exemplary embodiments of the invention will now be described with reference to the drawings.

First Embodiment

Figure 1:
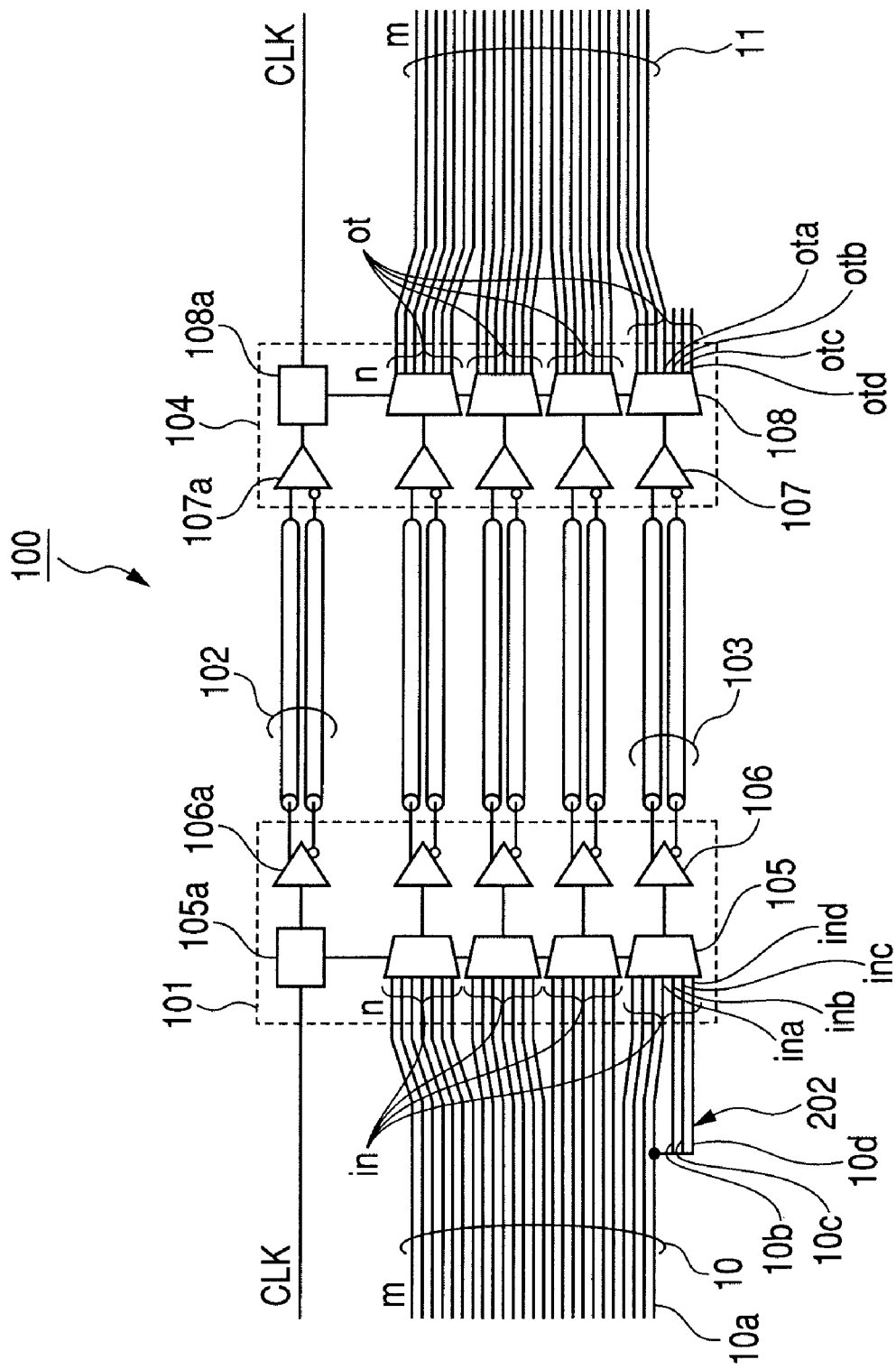
FIG. 1 is a schematic diagram illustrating amounting construction of a transmission system in the first embodiment.

FIG. 1 is a schematic diagram illustrating a construction of a signal transmission system 100 in the first embodiment of the invention.

Embodiment 1

In FIG. 1, the signal transmission system 100 includes a serializer IC (serializer unit) 101 and a deserializer IC (deserializer unit) 104. The serializer IC 101 has a plurality of (n) input terminals (parallel signal input terminals). The deserializer IC 104 has n output terminals (parallel signal output terminals) correspondingly to the input terminals. In FIG. 1, 28 input terminals are illustrated.

Serial conversion units 105 each for converting the parallel signals input from the n input terminals into a serial signal serialized in predetermined order are provided for the serializer IC 101. In FIG. 1, four serial conversion units 105 are provided and seven parallel signals are input to each of the serial conversion units. Output buffers (serial signal output units) 106 each for temporarily storing the serial signal converted by the serial conversion unit 105 before it is transmitted are provided for the serializer IC 101. In FIG. 1, four output buffers 106 are provided.

Input buffers (serial signal input units) 107 each for inputting the serial signal transmitted from the serializer IC 101 are provided for the deserializer IC 104. In FIG. 1, four input buffers 107 are provided. Parallel conversion units 108 each for converting again the serial signal received by the input buffer 107 into nparallel signals are provided for the deserializer IC 104. In FIG. 1, four parallel conversion units 108 are provided. Seven parallel signals are output from each of the parallel conversion units.

The number of serial conversion units 105, the number of parallel conversion units 108, the number of output buffers 106, and the number of input buffers 107 are not limited to the foregoing values. The number of parallel signals which are input to the serial conversion unit 105 and the number of parallel signals which are output from the parallel conversion unit 108 are not limited to the foregoing values either. They are set according to a form of the signal transmission system.

Transmission lines 103 for transmitting the serial signals are provided between the serializer IC 101 and the deserializer IC 104. In FIG. 1, the transmission lines 103 are differential signal transmission lines. An LVDS (Low-Voltage Differential Signaling) driver for converting the parallel signals of a single end into a serial signal of the LVDS can be used as a serializer IC 101. An LVDS receiver the parallel signals of a single end can be used as a deserializer IC 104. Although the transmission lines 103 are assumed to be the differential signal transmission lines, the invention is not limited them but may be a single transmission line.

In the signal transmission system 100, a clock signal is transmitted by a system different from that of the foregoing serial signal. First clock signal wirings are connected to clock signal input terminals of the serializer IC 101. Reference numeral 102 denotes clock signal transmission lines for transmitting the clock signals between the serializer IC 101 and the deserializer IC 104. Second clock signal wirings are connected to clock signal output terminals of the deserializer IC 104. The clock signal transmission lines 102 are also assumed to be the differential signal transmission lines in a manner similar to the transmission lines 103.

In the signal transmission system 100, the clock signals are transmitted synchronously with the conversion of the parallel signals into the serial signal in the serializer IC 101 and with the conversion of the serial signal into the parallel signals in the deserializer IC 104. Therefore, a PLL (Phase Locked Loop) 105a such as a multiplexer or the like and an output buffer for the clock signal (clock signal output unit) 106a are also provided for the serializer IC 101. Similarly, the deserializer IC 104 includes: a PLL 108a such as a demultiplexer or the like; and an input buffer for the clock signal (clock signal input unit) 107a.

First parallel signal wirings 10 constructed by m (m is an integer smaller than n) wirings are connected to input terminals of the serializer IC 101. The parallel signals constructed by parallel m bit data are input from the first parallel signal wirings 10. Therefore, the (n−m) terminals among the n input terminals of the serializer IC 101 become redundant input terminals which are not connected to the first parallel signal wirings. In FIG. 1, the number of wirings of the first parallel signal wirings is equal to 24 and the number of redundant input terminals is equal to 3. The redundant input terminals are indicated by inb, inc, and ind, respectively. The input terminal adjacent to the redundant input terminals inb, inc, and ind is assumed to be ina. The number of redundant input terminals is not limited to 3.

In the first parallel signal wirings 10, a wiring 10a connected to the input terminal ina is branched off into three branch wirings 10b, 10c, and 10d at a branch point 202. The branch wiring 10b is connected to the input terminal inb. The branch wiring 10c is connected to the input terminal inc. The branch wiring 10d is connected to the input terminal ind. A bit signal which is input from the wiring 10a to the input terminal ina is defined as a reference bit signal. Bit signals which are input from the branch wirings 10b, 10c, and 10d to the redundant input terminals inb, inc, and ind are defined as branch bit signals, respectively. The serial conversion unit 105 operates in such a manner that in the serial signal which is transmitted from the serializer IC 101, the reference bit signal input from the input terminal ina and the branch bit signals input from the redundant input terminals inb, inc, and ind are converted as bits which are temporally continuous.

Second parallel signal wirings 11 constructed by m (m is an integer smaller than n) wirings are connected to the deserializer IC 104. The parallel signals constructed by parallel signals of m bit data are output from the second parallel signal wirings 11. Therefore, the (n−m) terminals among the n output terminals of the deserializer IC 104 become redundant output terminals which are not connected to the second parallel signal wirings 11. In FIG. 1, the number of wirings of the second parallel signal wirings 11 is equal to 24 and the number of redundant output terminals is equal to 3. The redundant output terminals are indicated by otb, otc, and otd, respectively. The output terminal adjacent to the redundant output terminals otb, otc, and otd is assumed to be ota. The redundant input terminals are indicated by otb, otc, and otd are unconnected terminals which are not connected to the second parallel signal wirings 11, other circuit elements, a power source, the ground, and the like. The output terminal adjacent to the redundant output terminals is assumed to be ota. The number of redundant output terminals is not limited to 3.

Figure 2:
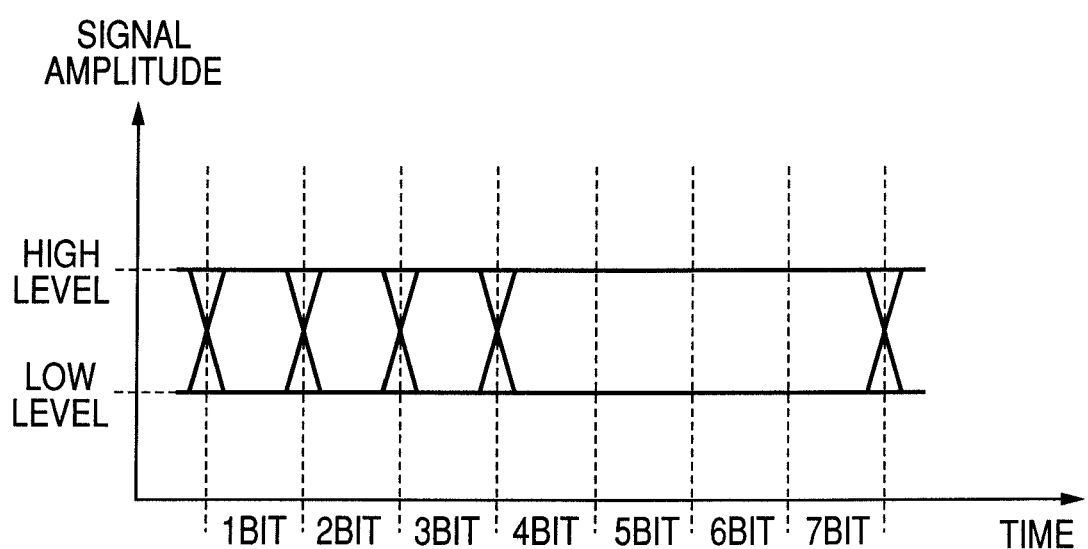
FIG. 2 is a schematic diagram illustrating a serial signal waveform which is transmitted in the first embodiment.

The four wirings (including the wiring 10a) from the first parallel signal wirings 10 and the three wirings 10b, 10c, and 10d branched at the branch point 202 of the wiring 10a are input to one of the serial conversion units 105. A waveform of the serial signal which is transmitted to the transmission lines 103 at this time is illustrated in FIG. 2. In FIG. 2, the first to fourth bits from the left are the bit signals from the first parallel signal wirings 10. The 4th bit is the reference bit signal from the wiring 10a. The fifth to seventh bits are branch bit signals from the three branched wirings 10b, 10c, and 10d. Each of the 5th to 7th bits as branch bit signals has a waveform held at the same signal level as that of the 4th bit signal as a reference bit signal. Therefore, the signal levels of the 4th to 7th bits are always set to the same high or low level and no signal transition occurs.

Comparative Example 1

Figure 8:
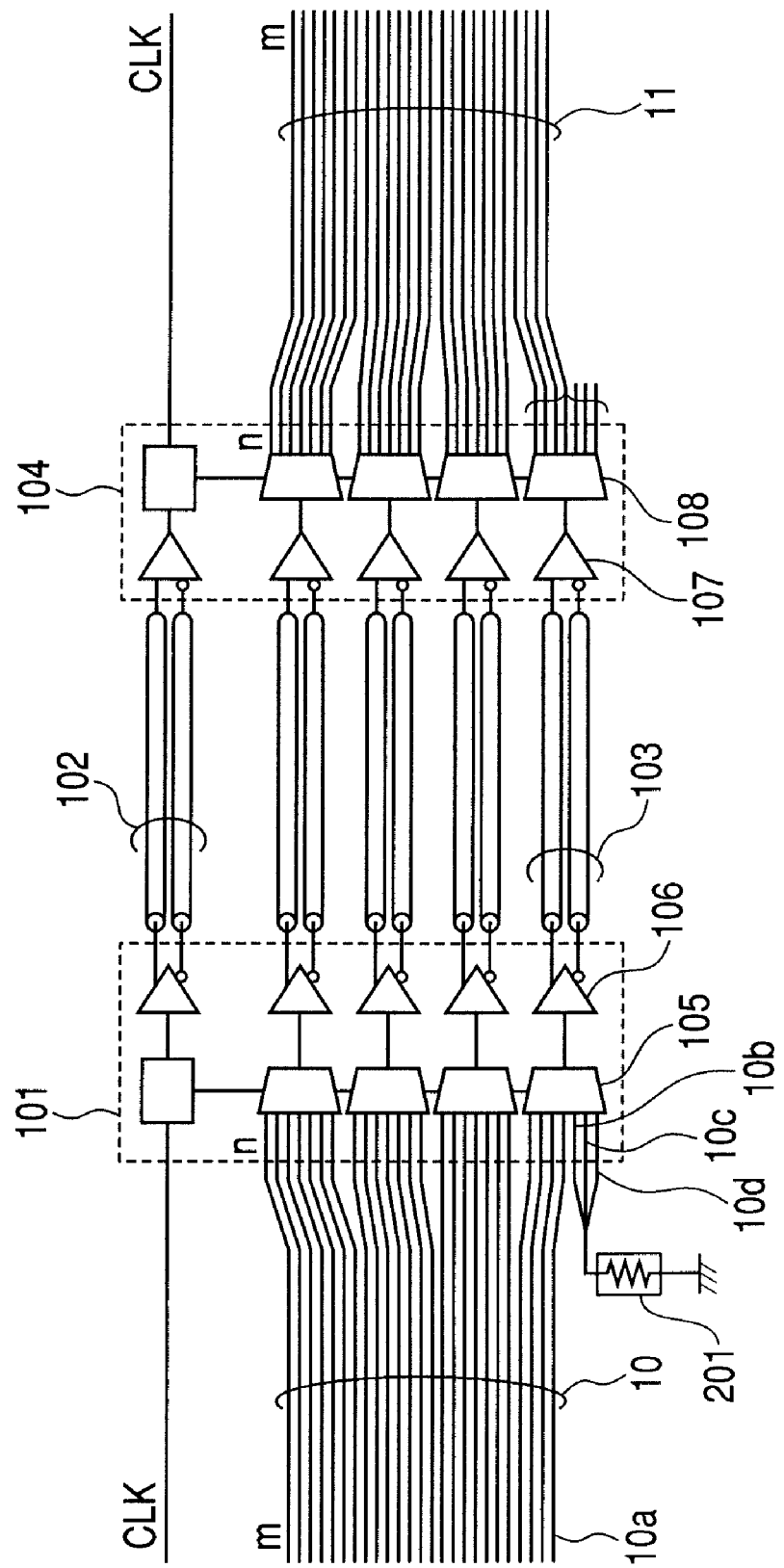
FIG. 8 is a schematic diagram illustrating another example in a comparative example 1.

FIG. 8 is a schematic diagram illustrating a conventional signal transmission system 300. In the signal transmission system 300, the redundant input terminals inb, inc, and ind of the serializer IC 101 are connected to the ground through a resistant circuit element 201. Thus, a fixed signal of the signal level which is always low is input to the redundant input terminals. In FIG. 8, the same component elements as those in FIG. 1 are designated by the same reference numerals and their description is omitted.

In the signal transmission system 300, the four wirings (including the wiring 10a) from the first parallel signal wirings 10 and the three wirings 10b, 10c, and 10d different from the first parallel signal wirings 10 are input to one of the serial conversion units 105. A waveform of the serial signal which is transmitted to the transmission lines 103 at this time is illustrated in FIG. 9. In FIG. 9, the first to fourth bits from the left are the bit signals from the bus wirings 10. The 4th bit is the bit signal from the wiring 10a. The fifth to seventh bits are the bit signals from the three branched wirings 10b, 10c, and 10d. The bit signals from the three branched wirings 10b, 10c, and 10d are always fixed to the low level. Therefore, when the 4th bit signal is at the high level, the signal transition occurs one more times as compared with the serial signal waveform illustrated in FIG. 2.

Experiment Example 1

Experiments to verify a radiation noise suppressing effect of the signal transmission system 100 illustrated in FIG. 1 are performed. In an experiment example 1, a data pattern of a digital signal in which a unit data period is equal to 5 nsec (including a transition time of 1 nsec) and an amplitude is equal to 1V is generated from a data pattern generator. The data pattern is a serial signal consisting of bit data of 28 bits. When the data pattern of 28 bits is expressed by a layout of 1 and 0, it is expressed as a bit pattern of 1010100 0101011 1000011 0111111.

The signal is generated from the data pattern generator according to such a setting that the data pattern is repetitively output. By inputting the serial signal to a spectrum analyzer, a part of a broad band spectrum of the data pattern is obtained and illustrated by a solid line in FIG. 3.

Comparative Experiment Example 1

Radiation noises of the signal transmission system 300 in a comparative example 1 are measured in a manner similar to the experiment example 1. In a comparative experiment example 1, a data pattern of a digital signal in which a unit data period is equal to 5 nsec (including a transition time of 1 nsec) and an amplitude is equal to 1V is generated from a data pattern generator. The data pattern is a serial signal consisting of bit data of 28 bits. When the data pattern of 28 bits is expressed by a layout of 1 and 0, it is expressed as a bit pattern of 1010100 0101010 1000010 0111110.

Figure 3:
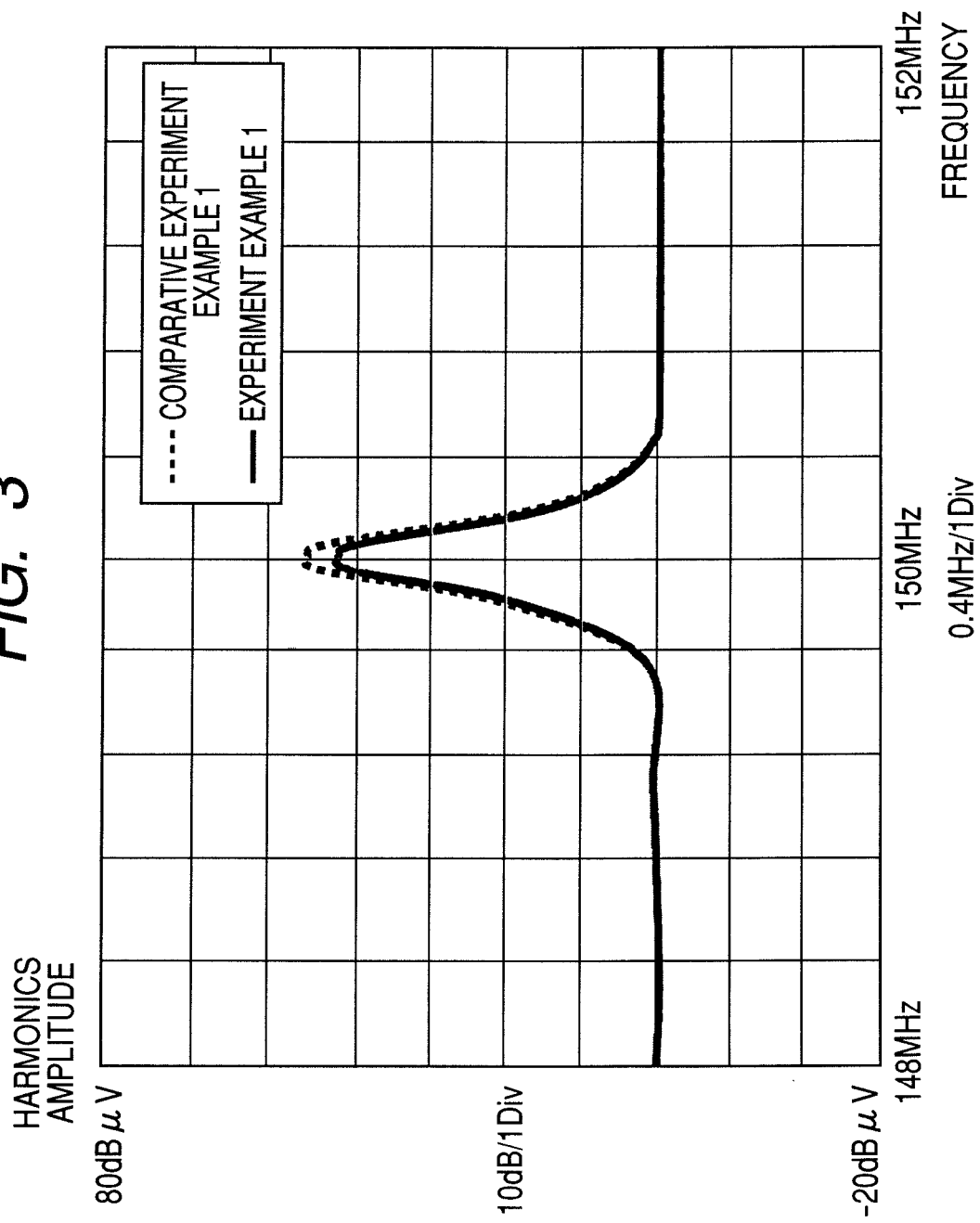
FIG. 3 is a graph illustrating broad band spectra of an experiment example 1 and a comparative experiment example 1.

By inputting the serial signal to the spectrum analyzer, a part of the broad band spectrum of the data pattern is obtained and illustrated by a broken line in FIG. 3.

When comparing the data pattern of the experiment example 1 with the data pattern of the comparative experiment example 1, they are different at two points of the 14th to 28th bits. That is, each level at four points of the 7th, 14th, 21st, and 28th bits in the data pattern of the experiment example 1 is always identical to each level of the one-precedent bit data (the 6th, 13th, 20th, and 27th bits) of them. On the other hand, the levels at four points of the 7th, 14th, 21st, and 28th bits in the data pattern of the comparative experiment example 1 are always fixed to 0. Thus, the total number of transition times of the experiment example 1 is smaller than the number of transition times of the comparative experiment example by 2.

Although the data patterns used in the experiment example 1 and the comparative experiment example 1 have the broad band spectra, FIG. 3 illustrates results obtained by measuring a spectrum intensity (an axis of ordinate indicates 5 dB/1 Div) of 4 MHz band width (an axis of abscissa indicates 0.67 MHz/1 Div) around 150 MHz, as a center, at which the intensity is particularly high. Measuring conditions of the spectrum analyzer are set to RBM=120 kHz and VBW=300 kHz. As will be understood from FIG. 3, when comparing the experiment example 1 with the comparative experiment example 1, a peak intensity of 200 MHz in the measurement result (solid line) of the experiment example 1 is smaller than a peak intensity in the measurement result (broken line) of the comparative experiment example 1 by about 3 dB. The value of 3 dB is very large as a radiation noise suppressing effect.

Figure 4:
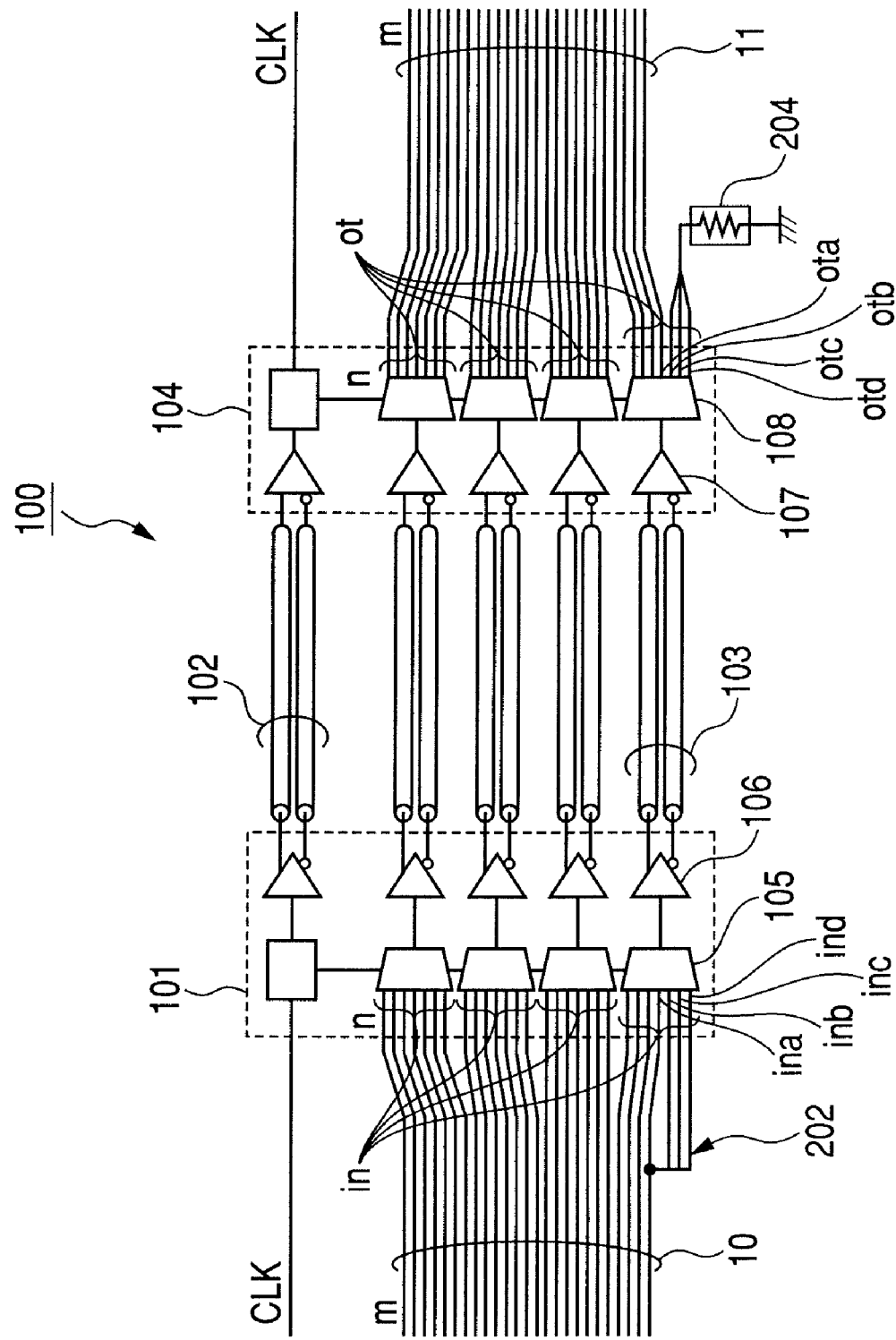
FIG. 4 is a schematic diagram illustrating another example in the first embodiment.

It is also possible to construct in such a manner that the redundant output terminals otb to otd illustrated in FIG. 1 are connected to the ground or power source by a resistant circuit element 204 of a high resistance as illustrated in FIG. 4. The data which is output from the output terminals otb to otd is the bit signal which has been input from the signal wiring 10*a* to the serializer IC 101 and the bit signal is output from the output terminal ota.

As described above, according to the signal transmission system 100 of the first embodiment, the suppression of the radiation noises of the serial transmission line can be extremely simply and reasonably realized. Since the branch bit signals branched from the parallel signals have been input to the redundant input terminals inb, inc, and ind of the serializer IC 101, it is difficult to be subjected to an influence of exogenous noises. The erroneous operation in the serializer IC 101 can be also simultaneously prevented.

Second Embodiment

Figure 5:
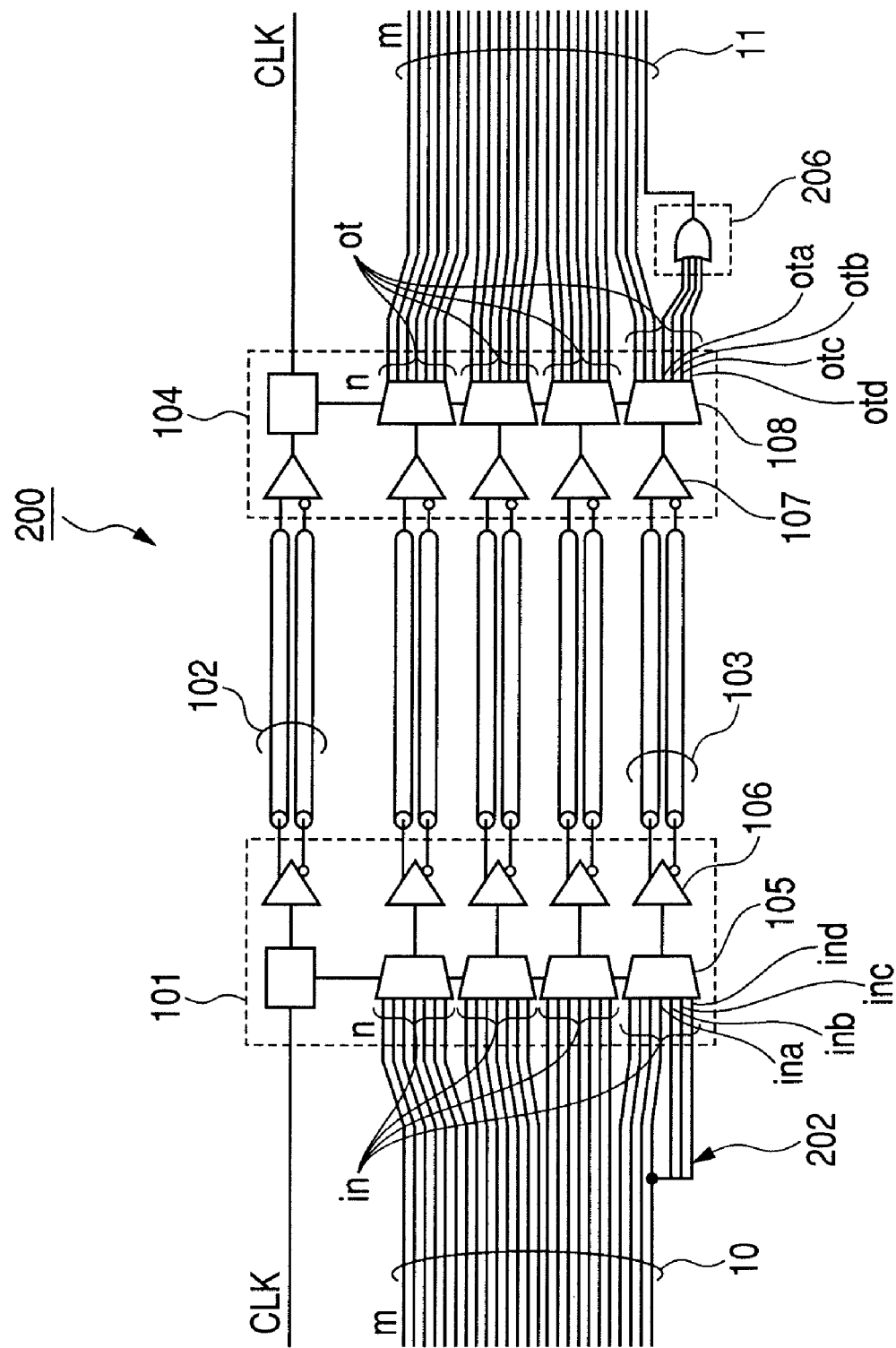
FIG. 5 is a schematic diagram illustrating an example in the second embodiment.

Subsequently, the second embodiment of the invention will be described with reference to FIG. 5. FIG. 5 is a schematic diagram illustrating a signal transmission system 200 in the second embodiment. The signal transmission system 200 in the embodiment is a system obtained by modifying a part of the foregoing first embodiment and, in FIG. 5, the same component elements as those in FIG. 1 are designated by the same reference numerals and their description is omitted.

Figure 7:
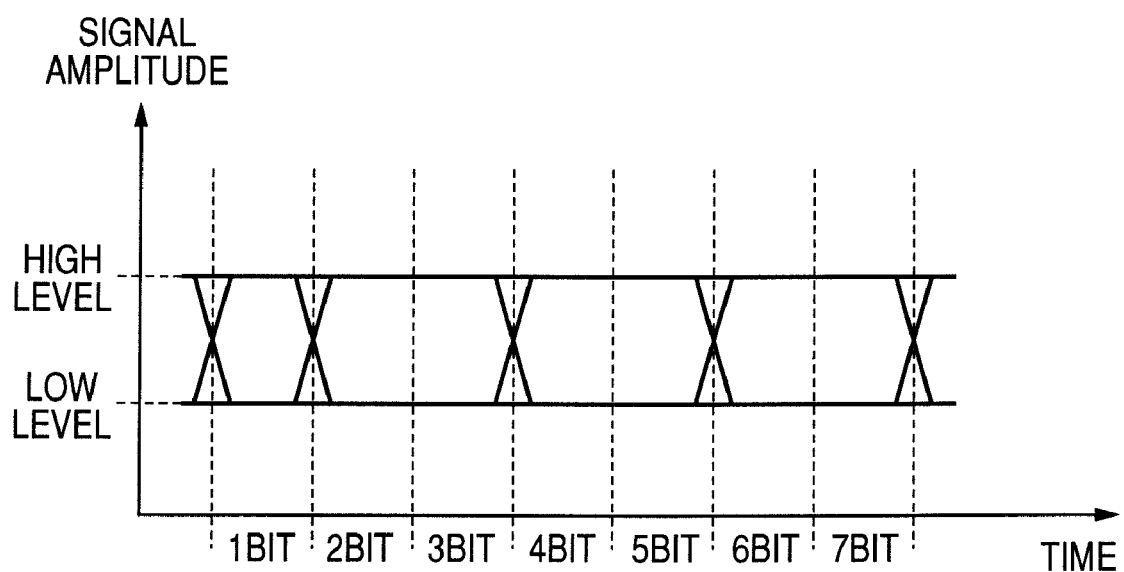
FIG. 7 is a schematic diagram illustrating a serial signal waveform which is transmitted in the second embodiment.

As illustrated in FIG. 5, the signal transmission system 200 differs from that in FIG. 1 mentioned above with respect to a point that the four bit signals from the output terminals ota to otd are transmitted through a discriminating device (selecting unit) 206 constructed by a logic circuit. A signal line which is output through the discriminating device 206 is connected as an output bit signal as one of the m parallel signal bus wirings 11. Since all of the four bit signals correspond to the reference bit signal which is input from the wiring 10*a* and the branch bit signals branched from the wiring 10*a* at the branch point 202 in FIG. 7, if no transmission errors are caused, the same data is transmitted for all of those four bit signals.

If the signal on the transmission lines 103 was influenced by the exogenous noises or the like, there is a possibility that an error occurs in the bit signal from one of the output terminals ota to otd. At this time, the error discrimination about the four bit signals is made by the discriminating device 206. In this error discrimination, it is assumed that since all of the four bit data branched off by the serializer IC 101 are inherently the same bit signal, the correct bit signal is output by getting a logical sum of the four bit data.

By transmitting the four bit signals which are inherently identical and making the error discrimination by using the four bit signals as mentioned above, transmission reliability of one bit signal to be certainly transmitted can be improved. Therefore, according to the embodiment, in addition to an effect of the harmonic suppression in the transmission of the serial signal, such an effect that the transmission reliability of the specific signal (bit signal) can be improved is obtained.

Figure 6:
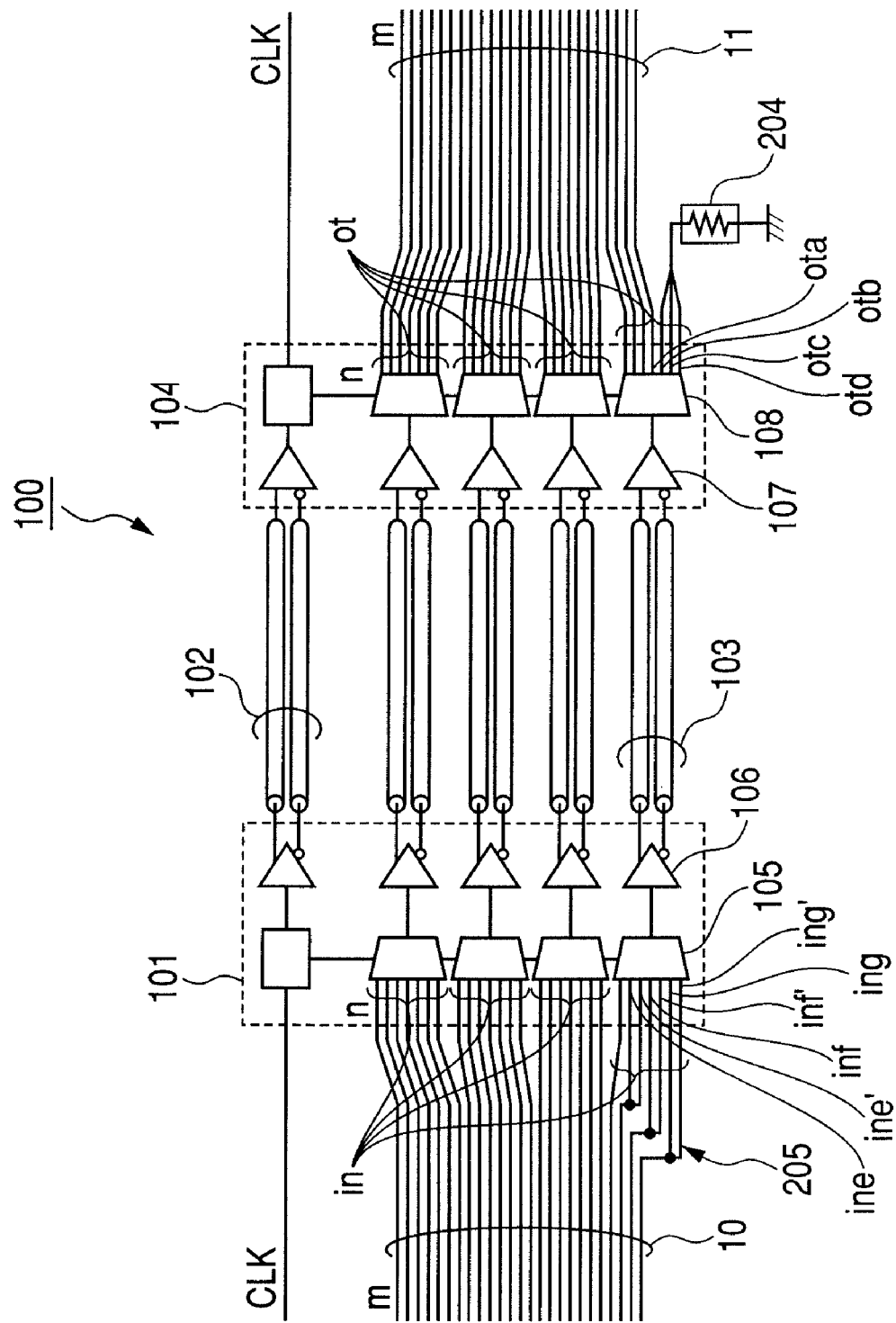
FIG. 6 is a schematic diagram illustrating another example in the second embodiment.

The numbers of inputs/outputs, input/output system, conversion system, branch structure, and the like of the signals in the serializer IC 101 and the deserializer IC 104 which have been described in the above first and second embodiments are not particularly limited. With respect to the branch structure among them, for example, a construction having a branch point 205 for branching off each of arbitrary three bit signals among the parallel signals into every two signals as illustrated in FIG. 6 may be used. The above arbitrary three bit signals are input as fundamental bit data from input terminals (parallel signal input terminals) ine, inf, and ing, respectively. Branch data obtained by branching off those fundamental bit data is input from input terminals (parallel signal input terminals) ine', inf', and ing', respectively. In this case, a waveform of the serial signal on the transmission lines 103 is as illustrated in, for example, FIG. 7. Also in this case, since the number of signal transition times per unit time is reduced to a value smaller than that in the related art illustrated in FIG. 8, an effect similar to that of the graph illustrated in FIG. 3 can be obtained.

The connection structure of the parallel signal wirings and the serializer IC 101 in the invention functions as a signal conversion circuit.

As mentioned above, the transmission system according to the invention is useful for a signal transmission system which effectively suppresses an unnecessary radiation and is particularly suitable for a signal transmission system in which it is required to stabilize the data transmission.

According to the invention, the suppression of the radiation noises of the serial transmission line can be extremely simply and reasonably realized without adding other expensive circuit elements, members, and the like. The serial signal transmission system itself becomes difficult to be subjected to the influence of the exogenous noises. The erroneous operation in the serializer IC can be also simultaneously prevented.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

The invention claimed is:

1. A signal transmission system comprising:
   first parallel signal wirings;
   second parallel signal wirings;
   a serializer unit comprising:
   a plurality of parallel signal input terminals connected to the first parallel signal wirings;
   a serial conversion unit constructed to convert parallel signals input from the plurality of parallel signal input terminals into a serial signal; and
   a serial signal output unit constructed to output the converted serial signal;
   a deserializer unit comprising:
   a serial signal input unit constructed to input the serial signal output by the serial signal output unit of the serializer unit;
   a parallel conversion unit constructed to convert again the serial signal input from the serial signal input unit into the parallel signals;
   a plurality of parallel signal output terminals constructed to output the converted parallel signals to the second parallel signal wirings; and
   a transmission line constructed to connect the serializer unit and the deserializer unit,
   wherein one of the first parallel signal wirings is branched off into a plurality of branch wirings different from the first parallel signal wirings, the branch wirings and the first parallel signal wirings are connected to the parallel signal input terminals, and when each of the signals input from the branch wirings is converted by the serial conversion unit, the signal is converted into the serial signal so as to be temporally continuous with the signal input from the one of the first parallel signal wirings.

2. A signal transmission system according to claim 1, wherein
   the parallel signal output terminals are for outputting bit data input from the branch wirings to the serializer unit and are unconnected terminals.

3. A signal transmission system according to claim 1, wherein
all of the parallel signal output terminals are for outputting bit data input from the branch wirings to the serializer unit and are connected to a power source or a ground.

4. A signal transmission system according to claim 1, wherein
the parallel signal output terminals are for outputting bit data input from the branch wirings to the serializer unit and are connected to a selection unit for selecting and outputting one of the parallel signal output terminals as an output bit signal.

5. A signal transmission system according to claim 1, wherein
with respect to all of the serial conversion unit, the serial signal output unit, the serial signal input unit, and the parallel conversion unit, the same number of two or more units are provided, respectively.

6. A signal transmission system according to claim 1, wherein
the transmission line is differential signal transmission lines.

7. A signal transmission system according to claim 1, wherein:
the serializer unit has a clock signal input terminal to which a first clock signal wiring is connected, a PLL for converting the clock signal, and a clock signal output unit for outputting the converted clock signal;
the deserializer unit has a clock signal input unit to which the clock signal from the serializer unit is input, a PLL for converting the clock signal from the clock signal input unit, and a clock signal output terminal to which a second clock signal wiring is connected; and
the clock signal output unit and the clock signal input unit are connected to each other by a clock signal transmission line.

8. A signal transmission system according to claim 7, wherein:
the clock signal transmission line is differential signal transmission lines.

9. A signal conversion circuit comprising:
parallel signal wirings; and
a serializer unit comprising:
a plurality of parallel signal input terminals connected to the parallel signal wirings;
a serial conversion unit constructed to convert parallel signals input from the plurality of parallel signal input terminals into a serial signal; and
a serial signal output unit constructed to output the converted serial signal,
wherein one of the parallel signal wirings is branched off into a plurality of branch wirings different from the parallel signal wirings, the branch wirings and the parallel signal wirings being connected to the parallel signal input terminals, and when each of the signals input from the branch wirings is converted by the serial conversion unit, the signal is converted into the serial signal so as to be temporally continuous with the signal input from the one of the parallel signal wirings.

10. A signal transmission system comprising:
a serializer unit constructed to input first parallel signals from first parallel signal wirings;
a deserializer unit constructed to output second parallel signals to second parallel signal wirings; and
a transmission line constructed to transmit a serial signal from the serializer unit to the deserializer unit,
wherein the serializer unit converts the first parallel signals into the serial signal and outputs the serial signal to the transmission line,
wherein the deserializer unit converts the serial signal from the transmission line into the second parallel signals, and
wherein one of the first parallel signal wirings is branched off into a plurality of branch wirings different from the first parallel signal wirings, the branch wirings and the first parallel signal wirings are connected to the serializer unit, and the serializer unit converts the signals from branch wirings into a part of the serial signal so as to be temporally continuous with the signal input from the one of the first parallel signal wirings.

* * * * *